(12) United States Patent
Subramanian

(10) Patent No.: US 11,667,217 B2
(45) Date of Patent: Jun. 6, 2023

(54) SEAT ADJUSTMENT MECHANISM FOR A VEHICLE SEAT, AND VEHICLE SEAT

(71) Applicant: ADIENT ENGINEERING AND IP GMBH, Burscheid (DE)

(72) Inventor: Karthikeyan Maharajapuram Subramanian, Leverkusen (DE)

(73) Assignee: Keiper Seating Mechanisms Co., Ltd, Shanghai (CN)

( * ) Notice: Subject to any disclaimer, the term of this patent is extended or adjusted under 35 U.S.C. 154(b) by 153 days.

(21) Appl. No.: 16/642,086

(22) PCT Filed: Aug. 27, 2018

(86) PCT No.: PCT/EP2018/072972
§ 371 (c)(1),
(2) Date: Feb. 26, 2020

(87) PCT Pub. No.: WO2019/042914
PCT Pub. Date: Mar. 7, 2019

(65) Prior Publication Data
US 2020/0207240 A1 Jul. 2, 2020

(30) Foreign Application Priority Data
Aug. 28, 2017 (DE) ...................... 10 2017 215 001.7

(51) Int. Cl.
*B60N 2/16* (2006.01)
(52) U.S. Cl.
CPC .................... *B60N 2/163* (2013.01)

(58) Field of Classification Search
CPC ........ B60N 2/16; B60N 2/1605; B60N 2/163; B60N 2/1695; B60N 2/0232; B60N 2/074;
(Continued)

(56) References Cited

U.S. PATENT DOCUMENTS 3,355,211 A 11/1967 Kolle
3,405,902 A * 10/1968 Homier ................ B60N 2/0232
248/404
(Continued)

FOREIGN PATENT DOCUMENTS

CN 105228903 A 1/2016
DE 3130444 A1 2/1983
(Continued)

OTHER PUBLICATIONS

European Patent Office, European Office Action in application No. EP 2018762807.8, dated Mar. 19, 2021, 5 pages.
(Continued)

*Primary Examiner* — Jonathan Liu
*Assistant Examiner* — Guang H Guan
(74) *Attorney, Agent, or Firm* — Marshall & Melhorn, LLC

(57) ABSTRACT

A seat adjustment mechanism for a vehicle seat may have a number of first rail pairs, each first rail pair having an upper rail and a lower rail. A height adjustment mechanism may be arranged between the number of first rail pairs and a seat part of the vehicle seat. The height adjustment mechanism may have a number of second rail pairs, each second rail pair may have an upper rail and a lower rail. The number of first rail pairs and the number of second rail pairs can be actuated simultaneously.

9 Claims, 3 Drawing Sheets

(58) Field of Classification Search
CPC .. B60N 2/0735; B60N 2/0737; B60N 2/1615; B60N 2/162
USPC .......... 297/344.12, 344.13, 344.14; 248/419, 248/420
See application file for complete search history.

(56) References Cited

U.S. PATENT DOCUMENTS

| | | | |
|---|---|---|---|
| 3,841,696 A | 10/1974 | Wagner | |
| 4,440,442 A * | 4/1984 | Drouillard | B60N 2/123 248/430 |
| 4,479,626 A | 10/1984 | Kluting et al. | |
| 4,652,052 A * | 3/1987 | Hessler | B60N 2/123 248/430 |
| 4,768,831 A | 9/1988 | Liedberg et al. | |
| 4,796,951 A * | 1/1989 | Tamura | B60N 2/0284 188/82.2 |
| 4,838,515 A * | 6/1989 | Prentice | F16M 11/18 248/661 |
| 4,944,555 A | 7/1990 | Brusasco | |
| 5,137,331 A * | 8/1992 | Colozza | B60N 2/123 248/430 |
| 5,213,388 A * | 5/1993 | Baker | B60N 2/0717 180/287 |
| 5,529,275 A * | 6/1996 | Cornell | B60N 2/12 248/429 |
| 6,318,802 B1 * | 11/2001 | Sjostrom | B60N 2/0705 296/65.13 |
| 7,552,000 B2 * | 6/2009 | Beneker | B60N 2/0224 280/735 |
| 7,568,675 B2 * | 8/2009 | Catton | B60N 2/508 296/65.02 |
| 8,033,589 B2 * | 10/2011 | Kusanagi | B60N 2/067 296/68.1 |
| 9,463,717 B2 * | 10/2016 | Yin | B60N 2/005 |
| 9,975,454 B2 | 5/2018 | Cailleteau | |
| 10,393,242 B2 * | 8/2019 | Preissner | F16H 25/183 |
| 11,135,945 B2 * | 10/2021 | Subramanian | B60N 2/1615 |
| 11,273,731 B2 * | 3/2022 | Park | B60N 2/06 |
| 11,420,538 B2 * | 8/2022 | Cho | B60N 2/1635 |
| 2007/0295882 A1 | 12/2007 | Catton | |
| 2020/0207240 A1 * | 7/2020 | Subramanian | B60N 2/06 |

FOREIGN PATENT DOCUMENTS

| | | |
|---|---|---|
| DE | 3143122 A1 | 5/1983 |
| GB | 2014442 A | 8/1979 |
| JP | H0675868 U | 10/1994 |
| JP | 2009143457 A | 7/2009 |

OTHER PUBLICATIONS

European Patent Office, International Search Report with Written Opinion, issued in PCT/EP2018/072972, dated Nov. 16, 2018, 14 pages, European Patent Office, Rijswijk, Netherlands.

China National Intellectual Property Administration, Office Action issued in application No. 201880056069.2, dated Sep. 3, 2021, 8 pages.

* cited by examiner

SEAT ADJUSTMENT MECHANISM FOR A VEHICLE SEAT, AND VEHICLE SEAT

The invention relates to a seat adjustment mechanism for a vehicle seat and a vehicle seat.

Seat adjustment mechanisms for vehicle seats and vehicle seats are known in the prior art. With a known seat adjustment mechanism for a vehicle seat its position is adjustable in a longitudinal direction, that is to say in the x-direction. For this purpose, the vehicle seat comprises a first number of rail pairs, as a rule two rail pairs. Each rail pair comprises an upper rail and a lower rail.

The object of the present invention is to specify an improved seat adjustment mechanism of the aforementioned type and an improved vehicle seat.

The object is achieved by a seat adjustment mechanism and by a vehicle seat having the features specified in the claims.

According to a first alternative a seat adjustment mechanism for a vehicle seat comprises a number of first rail pairs, each first rail pair comprising an upper rail and a lower rail. According to the invention a height adjustment mechanism, which according to the first alternative comprises a number of second rail pairs, is arranged between the number of first rail pairs and a seat part of the vehicle seat, each second rail pair comprising an upper rail and a lower rail, the number of first rail pairs and the number of second rail pairs being actuatable simultaneously.

The advantages accruing with the seat adjustment mechanism according to the invention in the first alternative reside, in particular, in the fact that an adjustment of the position of the vehicle seat can be performed particularly rapidly with simultaneous actuation of the number of first rail pairs and the number of second rail pairs.

With the seat adjustment mechanism according to the invention it is possible, in particular, to significantly reduce the time taken to position a vehicle seat, in particular a driver's seat, from a comfort position, which is assumed during a drive state of a self-driving vehicle, to a driving position, compared to conventional seat adjustment mechanisms. Where the driving situation in self-driving vehicles demands, the vehicle seat can thereby be brought into the driving position particularly rapidly, so that the driver can more rapidly return to a seated position suitable for driving. This serves to increase safety and to reduce the likelihood of an accident.

According to a second alternative of the invention, instead of a number of first rail pairs a seat adjustment mechanism according to the invention for a vehicle seat comprises a first linear adjustment system, and instead of a number of second rail pairs a second linear adjustment system. The first and the second linear adjustment systems are actuatable simultaneously. A linear adjustment system comprises a number of fixed parts and a number of moving parts. For example, a linear adjustment system comprises a spindle drive. Embodiments of the second alternative of the invention are structurally similar and/or exercise essentially similar effects to the aforementioned embodiments of the first alternative of the invention.

According to a third alternative a seat adjustment mechanism according to the invention for a vehicle seat comprises a number of rail pairs and a linear adjustment system. The number of rail pairs and the linear adjustment system are actuatable simultaneously. For example, the linear adjustment system comprises a spindle drive. Embodiments of the third alternative of the invention are structurally similar and/or exercise essentially similar effects to the aforementioned embodiments of the first alternative of the invention.

In one embodiment of the seat adjustment mechanism according to the invention the number of first rail pairs or the first linear adjustment system is arranged and actuatable substantially in a vehicle longitudinal direction for a longitudinal adjustment of the seat and the number of second rail pairs or the second linear adjustment system is arranged and actuatable proportionally in the vehicle longitudinal direction and proportionally in elevation for a seat-height adjustment. That is to say an intended angle of the number of second rail pairs or of the second linear adjustment system relative to the number of first rail pairs or of the first linear adjustment system is less than 90°, so that on actuation of the height adjustment mechanism a proportional longitudinal adjustment of the seat part of the vehicle seat is automatically also allowed, which is possible simultaneously with actuation of the number of first and/or optional third rail pairs, so that in one simple and cost-effective construction an even more rapid positioning of the vehicle seat, in particular a driver's seat, is possible in a longitudinal direction with simultaneous seat-height adjustment.

A further embodiment of the seat adjustment mechanism according to the invention provides for a number of third rail pairs or a third linear adjustment system, either of which has substantially the same direction of action as the number of first rail pairs or the first linear adjustment system. This affords an even more rapid positioning of the vehicle seat, particularly on simultaneous actuation of all rail pairs or linear adjustment systems or a combination of these, in one simple and cost-effective construction. This makes it possible, for example, to significantly reduce the time taken to position a vehicle seat, in particular a driver's seat, in a longitudinal direction, that is in the x-direction, from a comfort position to a driving position, compared to conventional seat adjustment mechanisms.

In a further embodiment of the seat adjustment mechanism according to the invention upper rails of the number of first rail pairs or moving parts of the first linear adjustment system are fixed underneath to at least one lower rail of the number of second rail pairs or to a fixed part of the second linear adjustment system. This affords an especially rapid seat adjustment of simple design construction.

Here upper rails of the number of first rail pairs or moving parts of the first linear adjustment system are preferably fixed underneath to at least one lower rail of the number of second rail pairs or to the fixed part of the second linear adjustment system by means of a first connecting element. This affords a structurally simple and yet especially stable method of rapid seat adjustment.

In a further embodiment of the seat adjustment mechanism according to the invention an upper rail or upper rails of the number of second rail pairs or a number of moving parts of the second linear adjustment system is/are fixed underneath to the seat part of the vehicle seat. This affords a structurally simple and stable method of rapid seat adjustment.

Here, according to one alternative, the fixing is preferably achieved directly, and according to another alternative indirectly by means of a second connecting element, affording an especially effective and rapid seat adjustment of simple design construction.

In a further embodiment of the seat adjustment mechanism according to the invention lower rails of the number of third rail pairs or a number of fixed parts of the third linear adjustment system are fixed to the second connecting element and upper rails of the number of third rail pairs or a number of moving parts of the third linear adjustment system are firmly connected to a seat part carrier. This affords an exceptionally rapid seat adjustment of simple and stable design.

A further embodiment of the seat adjustment mechanism according to the invention provides for a first electric drive motor and/or a second electric drive motor and/or a third electric drive motor. The first electric motor serves to drive the number of first rail pairs or the first linear adjustment system. The second electric motor serves to drive the number of second rail pairs or the second linear adjustment system. The third electric motor serves to drive the number of third rail pairs or the third linear adjustment system.

A vehicle seat comprises a seat part. According to the invention an aforementioned seat adjustment mechanism is provided, and the vehicle seat therefore has the aforesaid advantages.

BRIEF DESCRIPTION OF THE DRAWINGS

Exemplary embodiments of the invention are explained in more detail, referring to drawings, in which.

Parts corresponding to one another are provided with the same reference numerals in all figures.

DETAILED DESCRIPTION

Figure 1:
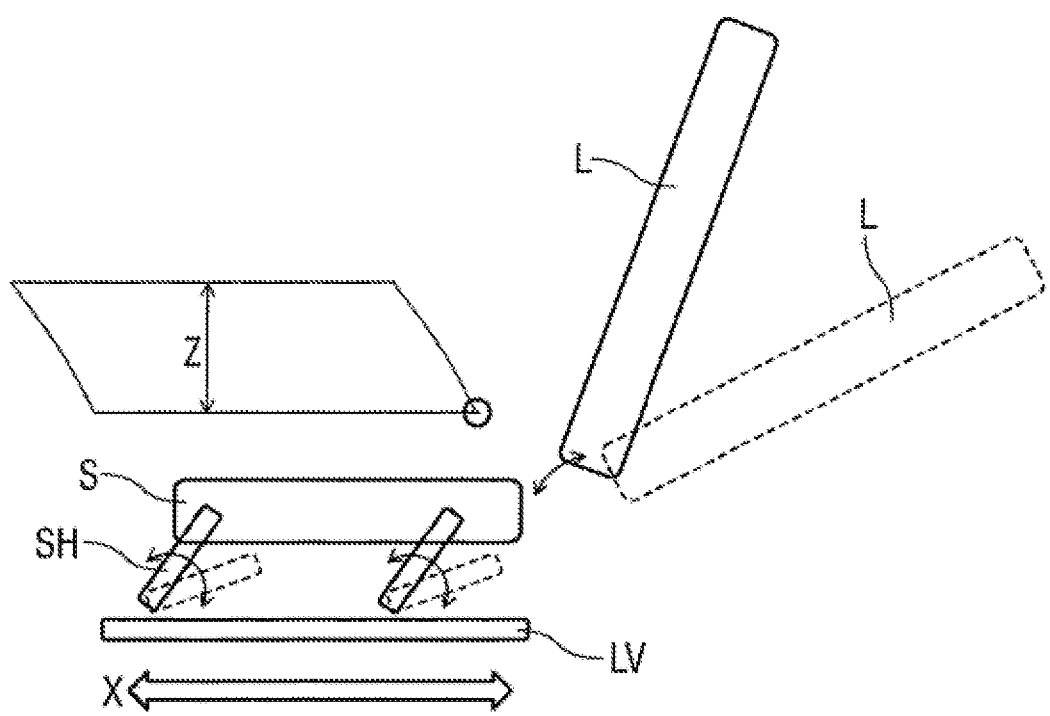
FIG. 1 schematically shows a side view of a seat adjustment mechanism for a vehicle seat according to the prior art, FIG. 2 schematically shows a side view of a first embodiment of a seat adjustment mechanism according to the invention, FIG. 3 schematically shows a side view of a second embodiment of a seat adjustment mechanism according to the invention

FIG. 1 schematically shows a side view of a seat adjustment mechanism for a vehicle seat according to the prior art. The vehicle seat comprises a tiltable backrest L and a seat part S. The seat adjustment mechanism serves for electrical adjustment of the vehicle seat in a longitudinal direction, that is to say in the x direction, and over a height labelled Z. For adjustment of the vehicle seat in a longitudinal direction, a longitudinal adjustment LV is provided, which comprises two known rail pairs. Pivot levers SH are provided for the height adjustment.

Figure 2:
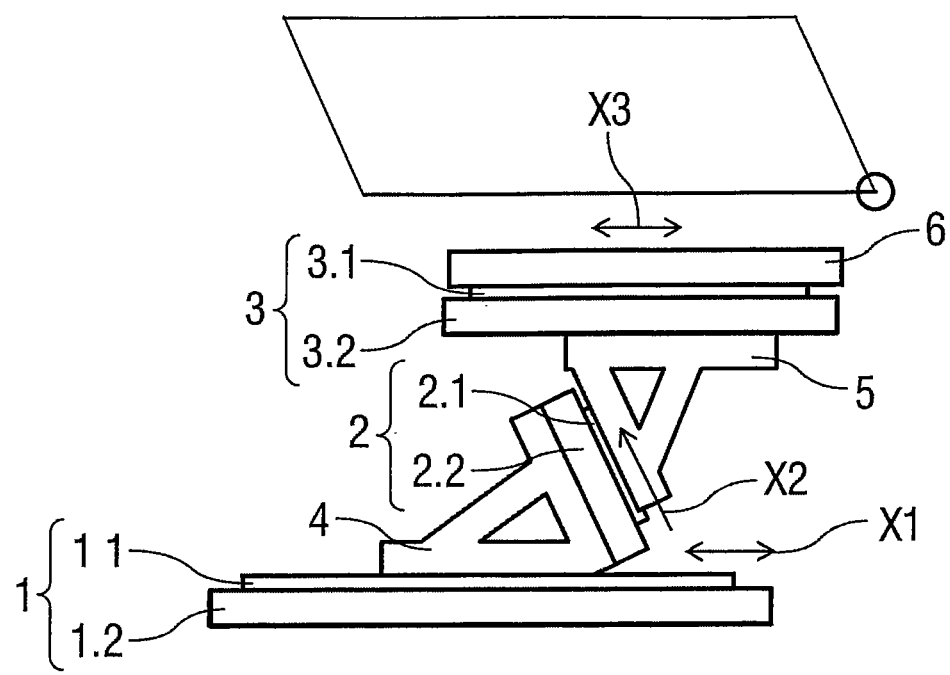

FIG. 2 schematically shows a seat adjustment mechanism for the electrical adjustment of a vehicle seat in a longitudinal direction, that is to say in an x-direction, and for the height adjustment. Two first rail pairs 1 arranged underneath each comprise an upper rail 1.1 and a lower rail 1.2. Two inclined second rail pairs 2 each comprise an upper rail 2.1 and a lower rail 2.2. The lower rails 1.2 of the first rail pair 1 are fixed underneath to a vehicle floor.

The upper rails 1.1 of the first rail pairs 1 are fixed indirectly, that is to say by means of a first connecting element 4, to the lower rails 2.2 of the second rail pairs 2.

Two third rail pairs 3, which each comprise an upper rail 3.1 and a lower rail 3.2, are arranged above the second rail pairs 2. The lower rails 3.2 of the third rail pairs 3 are fixed indirectly, that is by means of a second connecting element 5, to the upper rails 2.1 of the second rail pairs 2.

The first rail pairs 1 allow a displacement in the direction labelled X1, that is to say in a vehicle longitudinal direction. The second rail pairs 2 allow a displacement in the direction labelled X2, that is to say obliquely upwards. The third rail pairs 3 allow a displacement in the direction labelled X3, that is to say likewise in the vehicle longitudinal direction.

The upper rails 1.1 of the first rail pairs 1 arranged underneath are connected, for example screwed or welded, on the upper side to the first connecting element 4.

On actuation of the first rail pairs 1 arranged underneath a longitudinal adjustment ensues both of the connecting elements 4, 5 and of the second and third rail pairs 2, 3 affixed thereto, and thereby of a seat part carrier 6, relative to the vehicle floor. The seat part carrier 6 is fixed, for example screwed or welded, to the upper side of the upper rail 3.1 of the third rail pair 3.

On actuation of the inclined second rail pairs 2 there ensues both a longitudinal adjustment and a height adjustment both of the third rail pairs 3 and of the seat part carrier 6 indirectly affixed thereto relative to the first connecting element 4 and relative to the vehicle floor.

If the first rail pair 1 and the third rail pair 3 are actuated simultaneously and in the same direction of action, a longitudinal adjustment ensues at a rate corresponding to the sum of the differential speeds between the rails 1.1, 1.2 on the one hand and the rails 3.1, 3.2 on the other. This allows an especially rapid longitudinal adjustment of the vehicle seat for adjusting to the comfort position from the driving position, and vice-versa.

This is particularly advantageous because an especially rapid longitudinal adjustment of the vehicle seat from the comfort position into the driving position is allowed when, for example, the termination of a self-driving mode dictated by the driving situation is necessary, allowing a driver to take control of the vehicle.

If the first rail pair 1 and the second rail pair 2 are actuated simultaneously and in at least proportionally the same direction of action, a longitudinal adjustment ensues at a rate corresponding to the sum of the differential speeds between the rails 1.1, 1.2 on the one hand and a horizontal speed component of the rails 2.1, 2.2 on the other. This allows an especially rapid longitudinal adjustment of the vehicle seat for adjusting to the comfort position from the driving position, and vice-versa.

If the third rail pair 3 and the second rail pair 2 are actuated simultaneously and in at least proportionally the same direction of action, a longitudinal adjustment ensues at a rate corresponding to the sum of the differential speeds between the rails 3.1, 3.2 on the one hand and the horizontal speed component of the rails 2.1, 2.2 on the other. This allows an especially rapid longitudinal adjustment of the vehicle seat for adjusting to the comfort position from the driving position, and vice-versa.

The connecting elements 4, 5 are angular and like the rail pairs 1, 2, 3 stable enough to at least largely prevent an unwanted deformation of the seat even in the event of an accident.

Figure 3:
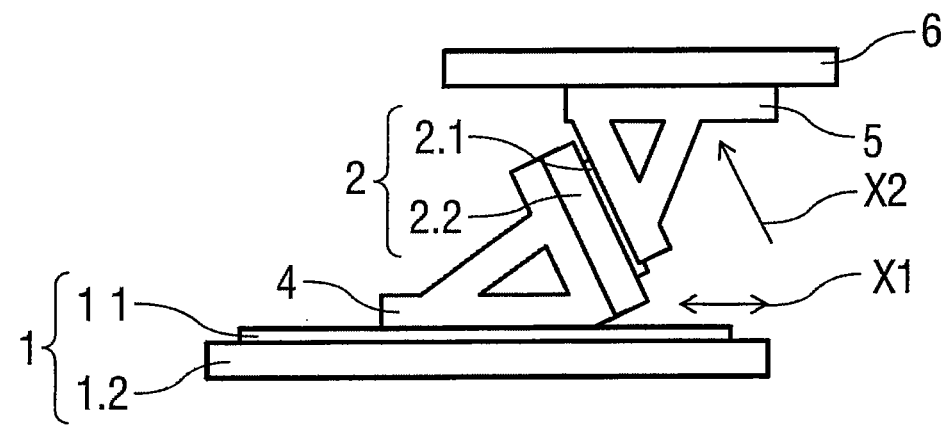

FIG. 3 schematically shows a second embodiment of a seat adjustment mechanism according to the invention for the electrical adjustment of a vehicle seat in a longitudinal direction and in elevation. This embodiment corresponds to the embodiment represented in FIG. 2 but does not comprise a third rail pair 3. Here the seat part carrier 6 is fixed to the upper rails 2.1 of the second rail pairs 2. The underside of the seat part carrier 6 is preferably fixed to the upper sides of the upper rails 2.1 of the second rail pairs 2.

If the first rail pair 1 and the second rail pair 2 are actuated simultaneously and in at least proportionally the same direction of action, a longitudinal adjustment ensues at a rate corresponding to the sum of the differential speeds between the rails 1.1, 1.2 on the one hand and a horizontal speed component of the rails 2.1, 2.2 on the other. This allows an especially rapid longitudinal adjustment of the vehicle seat for adjusting to the comfort position from the driving position, and vice-versa, in which a height adjustment simultaneously ensues.

Figure 4A:
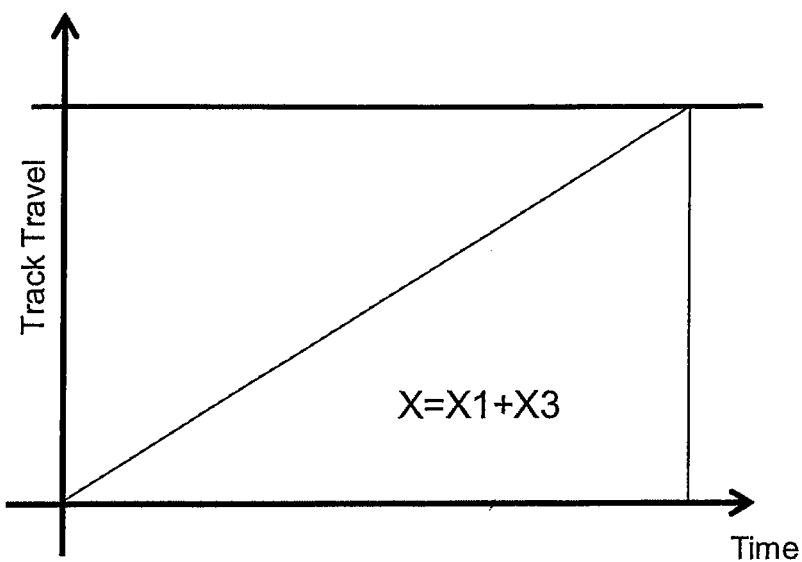
FIG. 4a, 4b show diagrams of longitudinal adjustments over time.

FIG. 4*a* shows a diagram with a time curve of a longitudinal adjustment, for example a maximum longitudinal adjustment, of a vehicle seat either solely through actuation of the first rail pairs 1 or solely through actuation of the third rail pairs 3. For achieving a specific longitudinal adjustment, for example a maximum longitudinal adjustment, a specific period of time is required.

Figure 4B:
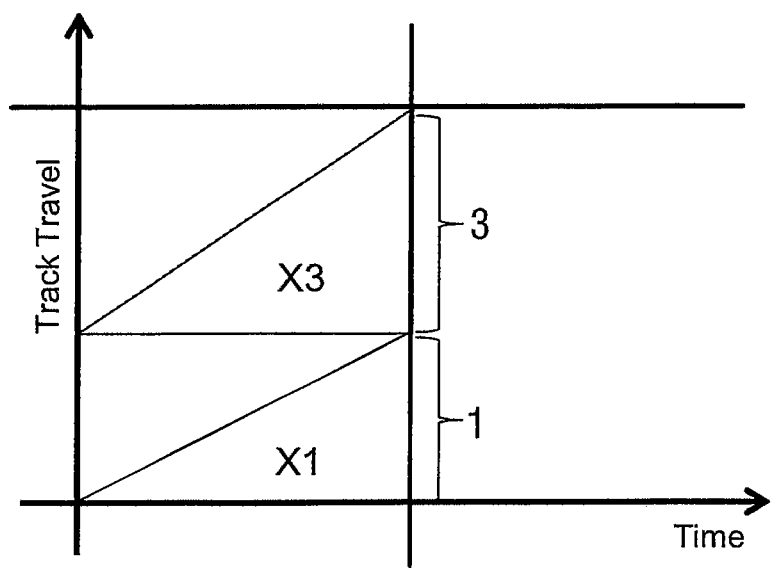

FIG. 4*b* shows a diagram with a time curve of a longitudinal adjustment, for example a maximum longitudinal adjustment, of the vehicle seat with simultaneous actuation of the first rail pairs 1 and the third rail pairs 3 ensuing in the same direction of action. For achieving a specific longitudinal adjustment, for example a maximum longitudinal adjustment, a period of time is required which is significantly less than that shown in FIG. 4*a*.

LIST OF REFERENCE NUMERALS

1 first rail pairs
1.1 upper rail of a first rail pair
1.2 lower rail of a first rail pair
2 second rail pairs
2.1 upper rail of a second rail pair
2.2 lower rail of a second rail pair
3 third rail pairs
3.1 upper rail of a third rail pair
3.2 lower rail of a third rail pair
4 first connecting element
5 second connecting element
6 seat part carrier
S seat part
L backrest
LV longitudinal adjustment
SH pivot lever

The invention claimed is:

1. A seat adjustment mechanism for a vehicle seat, comprising:
at least one first rail pair, wherein the at least one first rail pair comprises an upper rail and a lower rail,
a height adjustment mechanism, wherein the height adjustment mechanism comprises at least one second rail pair, wherein the at least one second rail pair comprises an upper rail and a lower rail,
at least one third rail pair, wherein the at least one third rail pair comprises an upper rail and a lower rail, and
a first connecting element, wherein the first connecting element connects the upper rail of the at least one first rail pair to the lower rail of the at least one second rail pair, wherein the first connecting element is positioned on an upper side of the upper rail of the at least one first rail pair,
wherein the at least one second rail pair is arranged between the at least one first rail pair and the at least one third rail pair,
wherein the lower rail of the at least one second rail pair is positioned on the first connecting element,
wherein the at least one first rail pair, the at least one second rail pair, and the at least one third rail pair are configured to be actuated simultaneously,
wherein each of the at least one first rail pair and the at least one third rail pair is configured to allow a displacement in a vehicle longitudinal direction,
wherein the at least one second rail pair is configured to allow a displacement in a direction substantially obliquely upwards with respect to the vehicle longitudinal direction, and
wherein the at least one second rail pair is inclined upwards with respect to the at least one first rail pair, such that, when the upper rail of the at least one second rail pair displaces obliquely upwards away from the at least one first rail pair, the upper rail of the at least one second rail pair is configured to bring the vehicle seat frontwards towards a driving position from a comfort position.

2. The seat adjustment mechanism as claimed in claim 1, wherein the at least one first rail pair is arranged and actuatable substantially in the vehicle longitudinal direction for a longitudinal adjustment of the vehicle seat, and the at least one second rail pair is arranged and actuatable proportionally in the vehicle longitudinal direction and proportionally in elevation for a seat-height adjustment of the vehicle seat.

3. The seat adjustment mechanism as claimed in claim 1, wherein the upper rail of the at least one first rail pair is configured to displace in the vehicle longitudinal direction with respect to the lower rail of the at least one first rail pair, and the upper rail of the at least one third rail pair is configured to displace in the vehicle longitudinal direction with respect to the lower rail of the at least one third rail pair.

4. The seat adjustment mechanism as claimed in claim 1, wherein the upper rail of the at least one first rail pair is fixed underneath to the lower rail of the at least one second rail pair.

5. The seat adjustment mechanism as claimed in claim 1, wherein the upper rail of the at least one first rail pair is fixed underneath to the lower rail of the at least one second rail pair via the first connecting element.

6. The seat adjustment mechanism as claimed in claim 5, wherein the upper rail of the at least one second rail pair is fixed underneath to a seat part.

7. The seat adjustment mechanism as claimed in claim 6, wherein the upper rail of the at least one second rail pair is fixed underneath to the seat part via a second connecting element.

8. The seat adjustment mechanism as claimed in claim 7, wherein the lower rail of the at least one third rail pair is fixed to the second connecting element, and the upper rail of the at least one third rail pair is firmly connected to a seat part carrier.

9. The seat adjustment mechanism as claimed in claim 1, further comprising a first electric motor for driving the at least one first rail pair and/or a second electric motor for driving the at least one second rail pair and/or a third electric motor for driving the at least one third rail pair.

* * * * *